United States Patent [19]

Burns et al.

[11] 4,207,918
[45] Jun. 17, 1980

[54] INSULATION JACKET

[75] Inventors: David Burns, Williamsville; James R. Spicer, Tonawanda, both of N.Y.

[73] Assignee: Insulation Distributors, Incorporated, Buffalo, N.Y.

[21] Appl. No.: 30,882

[22] Filed: Apr. 17, 1979

[51] Int. Cl.² ............................................. F16L 59/16
[52] U.S. Cl. ...................................... 137/375; 285/45; 138/149
[58] Field of Search ......................... 137/375; 285/45; 138/149

[56] References Cited

U.S. PATENT DOCUMENTS

| | | | |
|---|---|---|---|
| 1,108,840 | 8/1914 | Franke | 137/375 |
| 2,283,023 | 5/1942 | Williams et al. | 285/45 |
| 3,000,433 | 9/1961 | Kemper | 138/149 |
| 3,724,491 | 4/1973 | Knudsen et al. | 138/149 |
| 4,073,317 | 2/1978 | Ellis | 138/149 |
| 4,108,418 | 8/1978 | Ensign et al. | 137/375 |
| 4,112,967 | 9/1978 | Withem | 137/375 |

*Primary Examiner*—Martin P. Schwadron
*Assistant Examiner*—A. Michael Chambers
*Attorney, Agent, or Firm*—Sandler & Greenblum

[57] ABSTRACT

An insulation jacket for use as a valve cover. The jacket comprises a body portion comprising a central section and two lateral sections. Each of the lateral sections comprises an inboard and outboard belt and each of the belts extends along each of the lateral sections. The ends of each of the belts is adapted to interlock whereby the insulation jacket may be securely fastened around a valve casting.

11 Claims, 5 Drawing Figures

INSULATION JACKET

BACKGROUND OF THE INVENTION

1. Field of the Invention

The invention relates to insulation jackets for use as flanged valves which serve to thermally insulate valve covers, thus reducing thermal losses.

2. Description of Prior Art

In view of the high cost of energy it has been found highly desirable to insulate pipes and lines normally exposed to the atmosphere so as to cut down on heat losses and save energy. While the insulation of straight piping lends itself readily to known techniques, the insulation of valves and valve casings presents quite another problem in view of their unusual and varying shapes and sizes. Furthermore, it is important that the insulation cover used effectively seal off the exterior of the valve housing from the atmosphere so as to prevent energy leaks which might normally occur.

U.S. Pat. No. 4,112,967 to WITHEIM discloses a multi-layered flexible valve cover constructed to conform to valves having a stub-type valve construction. The use of Velcro-type fasteners for purposes of securing the insulation jacket around the piping is disclosed although other types of fasteners are also mentioned including buckles, clips, belts or other structure.

U.S. Pat. No. 1,108,840 to FRANKE discloses a multi-piece removable valve insulation casing provided with one or more drain holes along its surface to permit leakage thus rendering such leakage visible.

Finally, U.S. Pat. No. 4,073,317 to ELLIS discloses a strap which may be used in conjunction with an attached clamp to secure an insulation jacket around a pipe.

While the above patents evidence attempts at solving the problem of heat losses from valve casings, the prior art devices have proven themselves bulky and unmanageable while failing to provide completely satisfactory insulation protection.

SUMMARY OF THE INVENTION

It is, therefore, an object of the invention to provide a thermal insulation jacket for use as a valve cover which is simple to use and which requires only a minimum of maintenance.

It is yet a further object of the invention to provide an insulation jacket for use as a valve cover which may be used effectively in conjunction with valve casings to effectively minimize thermal losses through these valve casings to the atmosphere.

These and other objects are fulfilled by means of the thermal insulation jacket of the invention which comprises a body portion comprising a central section and two lateral sections. Each of the lateral sections comprises an inboard and outboard belt. Each of the belts extends along each of the lateral sections and the ends of each of the belts are adapted to interlock with each other whereby the insulation jacket may be securely fastened around a valve casing.

BRIEF DESCRIPTION OF DRAWINGS

With reference to the annexed drawings.

DESCRIPTION OF PREFERRED EMBODIMENTS

The thermal insulation jacket of the invention is particularly adapted for use in conjunction with valve casings which normally pose considerable obstacles for the types of insulation jackets commonly available. The thermal insulation jacket of the invention is flexible enough so as to be suitable for handling by personnel because of its easy application and removal yet nevertheless provides high thermal efficiency.

The thermal insulation jacket itself may be made of a wide variety of materials and in a wide variety of thicknesses and dimensions. Preferably, the thermal insulation jacket itself comprises a fiberglass cloth fabric coated with a silicone rubber coating so as to render the fabric resistant to water and ambient conditions. A most preferred fabric is 100% fiberglass lagging cloth. By selecting the proper outer facing for the insulation jacket the jacket may be easily removed and readily re-used thus reducing cost while providing effective insulation efficiency.

The insulation jacket is preferably stuffed with a lightweight flexible mat which preferably comprises type-E glass fibers although other types of packing may obviously be used depending upon the particular specifications. The thickness of the jacket may commonly be between 1 and 2 inches although other thicknesses are within the scope of the invention dependng upon specific conditions.

A very important feature of the invention is that the jacket is provided with a pair of inboard and outboard straps on each of the lateral sections of the jacket which make it possible to tightly secure the jacket around a valve casing such that the jacket extends beyond the flange formed between the casing and the line and may thus be tightened around the pipe insulation provided on the line to completely and thermally insulate the valve casing from the atmosphere.

The straps of the invention are held in place by means of lateral fasteners which hold the straps in place while permitting longitudnal sliding movement. When properly fitted, the jacket extends beyond the flange and the inboard and outboard straps are properly adjusted so as to provide an effective seal in conjunction with insulation provided along the connecting line.

Figure 1:
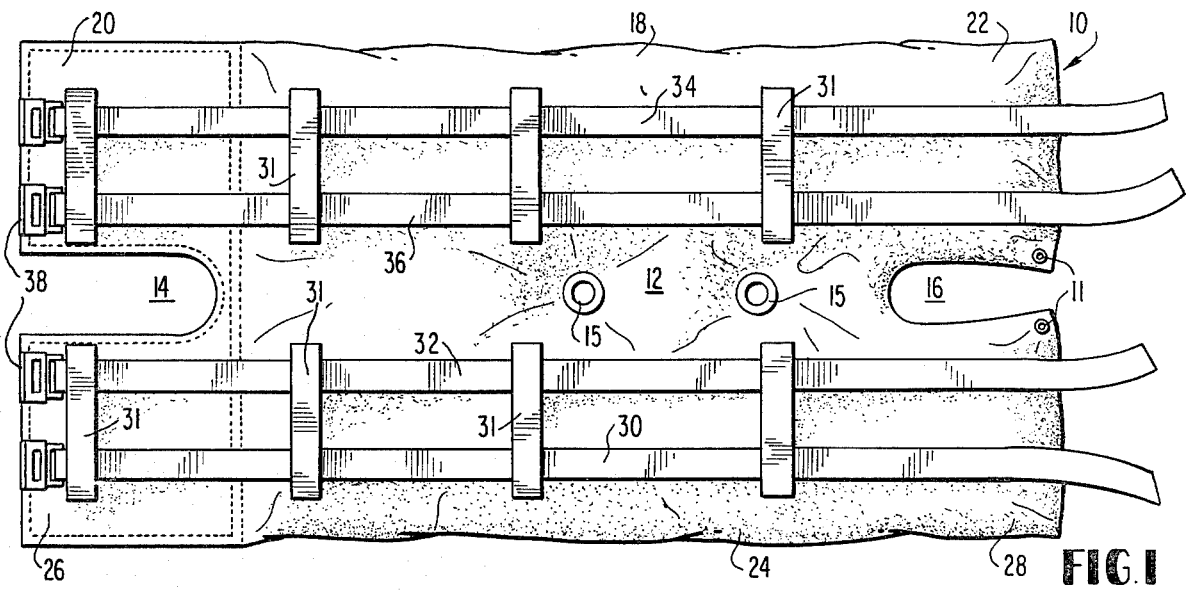
FIG. 1 is a top view of the insulation jacket of the invention.

FIG. 1 illustrates the thermal insulation jacket 10 which comprises lateral sections 18 and 24 with end flap sections 20, 22 and 26, 28 separated by means of slightly differing U-shaped cutouts 14 and 16 respectively. Each of the lateral sections 18 and 24 is separated by means of a central section 12. The central section comprises weep holes 15 which permit fluid which has leaked from the line to visibly drain out of the jacket. Outboard straps or belts 30 and 34 as well as inboard straps or belts 32 and 36 are respectively located on each of lateral sections 24 and 18. Each of the straps is provided with a buckle at one end thereof adapted to receive the other end of the strap such that the strap may be tightened around the valve casing when the jacket is wound around the casing. Although the straps are each illustrated as having a buckle 38 and a free end, the straps may be provided with a wide variety of fastening means to be used in conjunction with each of the straps.

Each of the straps is generally maintained in place by means of lateral securing strips 31 which, although holding the straps onto the jacket, nevertheless permit the straps to slide longitudinally.

As shown, the flaps 20 and 26 comprise unpadded insulation while flaps 22 and 28 are padded in a fashion similar to the central portion of the jacket. Flaps 20 and 26 are adapted to overlap flaps 22 and 28 when the jacket is used. To facilitate assembly of the jacket grommets 11 may be provided which permit the user to secure flaps 22 and 28 around the upstanding portion of the valve by means of wires or the like which secure one end of the jacket to the valve casing thus freeing both of the user's hands to wrap and strap the jacket.

Figure 2:
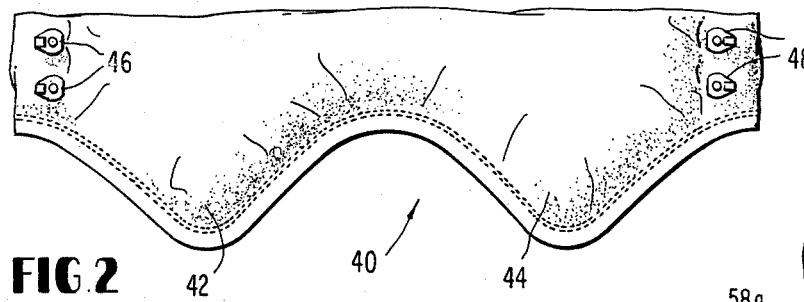
FIG. 2 is a side view of the skirt of the invention in flattened condition.

FIG. 2 illustrates an insulation skirt which may be used in conjunction with the jacket of the invention so as to thermally insulate the upstanding portion of a valve casing against thermal losses. As shown, the skirt 40 is provided with parabolic shaped sections which, when the skirt is wrapped around an upstanding section of a valve casing, correspond to the U-shaped cutouts of the insulation jacket. The skirt 40 is additionally provided with fastening means 46 and 48 which make it possible to securely fasten the skirt. The fastening means may comprise a series of hooks adapted to be used in conjunction with twist wires or the like for securing the skirts. Additionally, the skirt may be provided with a series of straps such as those disclosed in FIG. 1 or may be fastened in any other desired fashion.

Figure 3:
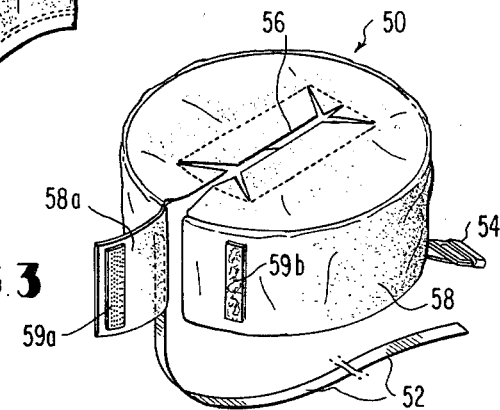
FIG. 3 is an perspective view of the cap of the invention.

FIG. 3 illustrates an insulation cap 50 provided with an upper wall and a slit 56 adapted to accomodate the control wheel of a valve mounted on a valve stem such that the cap may be slipped over the control wheel and lowered to surround the skirt by means of a lateral wall 58. The lateral wall is provided with a strap 52 and buckle 54 for securing the cap over the skirt and around the valve casing.

The cap may further be provided with mating velcro sections 59a and 59b in cutaway section 58 to provide for further ease of assembly.

Figure 4:
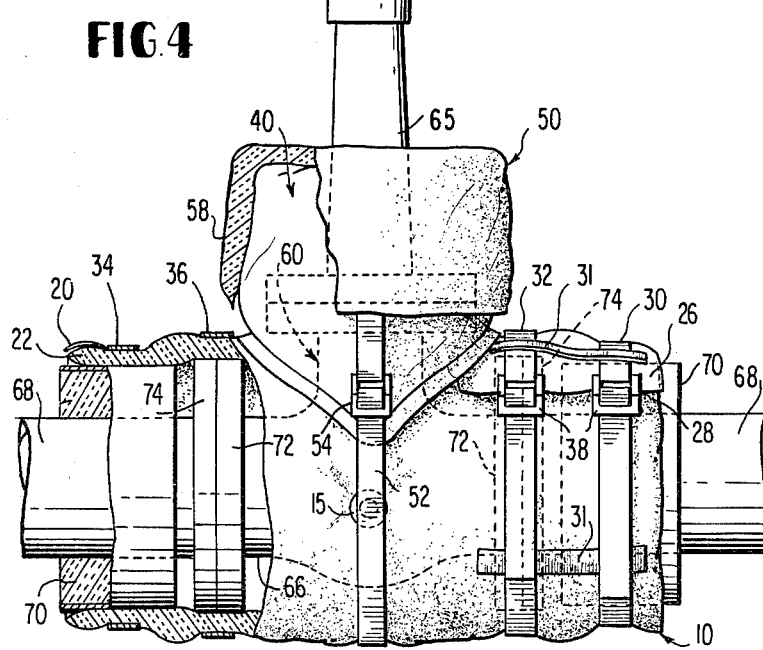
FIG. 4 is a side view of the insulation jacket, partialy cut away, when used in conjunction with a valve casing.

FIG. 4 illustrates the insulation jacket when used in conjunction with a valve casing 60 having an upstanding section 65 and a horizontal section 66. The horizontal section of the valve casing ends in a flange 72 which mates with a flange 74 provided at the edge of line pipe 68. Line pipe 68 is encased within conventional insulation 70 which forms a cylindrical casing around the pipe line. As shown, the insulation 70 extends up to flange 74. Insulation jacket 10 provided with inboard strap 30 and outboard strap 32 is wound around horizontal valve casing section 66 and is adapted to extend beyond flanges 72 and 74 such that it extends up to and over insulation jacket 70. Inboard strap 30 surrounds the mating point of the two flanges 72 and 74 to tightly seal the jacket around the horizontal section of the casing while outboard strap 32 located beyond flange 74 securely and effectively maintains the insulation jacket wrapped around insulation jacket 70 thus assuring an essentially complete seal.

Figure 5:
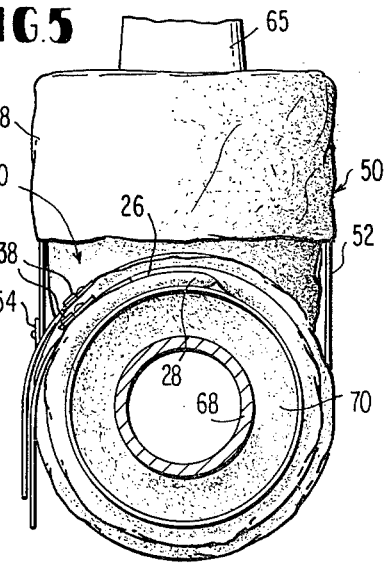
FIG. 5 is an end view of the insulation jacket in the assembled position.

As may be seen from FIG. 5, the insulation jacket of the invention is used by winding it around the valve casing such that flaps 26 and 20 overlap flaps 22 and 28 and are strapped over line insulation 70 by means of outboard straps 30 and 36.

The invention has been described with respect to particular embodiments and materials. It is to be understood however that the invention is not limited in either of these respects and is to be construed only in light of the claims.

What is claimed is:

1. A three-piece thermal insulation jacket for use as a valve cover, said jacket comprising:
    (a) a body portion comprising a central section and two lateral sections each lateral section including an inboard and outboard belt, each lateral section having two ends and a flap at each end, the flaps at each end of the jacket being separated by a U-shaped cutout at each end of said central section, each of said belts extending along each of said lateral sections, the ends of each of said belts being adapted to interlock with each other said body portion adapted to be disposed around a horizontal section of a valve casing, said U-shaped cutouts adapted to be disposed around an upstanding section of said valve casing, whereby said body portion may be securely fastened around said valve casing;
    (b) a skirt section, comprising two parabolic sections adapted to cooperate with each of said U-shaped cutouts whereby said skirt is adapted to surround said upstanding section; and
    (c) an insulation cap having a upper wall and a lateral wall, said lateral wall adapted to surround said skirt, whereby said body portion, said skirt and said cap assure an essentially complete seal when they are positioned about said valve casing.

2. A thermal insulation jacket for use as a valve cover, said jacket comprising: a body portion comprising a central section and two lateral sections each comprising an inboard and outboard belt, each of said belts extending along each of said lateral sections, the ends of each of said belts being adapted to interlock with each other whereby said insulation jacket may be securely fastened around a valve casing, each of said lateral sections having two ends and a flap at each end of said section, the flaps at each end of said jacket separated from one another by a U-shaped cutout adapted to surround the base of said valve casing, said body portion including insalation padding and each of said lateral sections including insulation padding, only one flap on each of said lateral sections including insulation padding, the other of said flaps including no insulation padding.

3. A thermal insulation jacket used to cover a valve casing which has an upstanding section and a horizontal section, said horizontal section including a flange at each end adapted to be connected to a pipe, said jacket comprising: a body portion having a central section and two lateral sections, each lateral section including an inboard and an outboard belt, each of said belts extending along each of said lateral sections, the ends of each of said belts being adapted to interlock with each other, whereby when said jacket is wrapped about said horizontal section of said casing, each of said inboard belts surrounds one of said casing flanges and each of said outboard belts extends beyond a respective one of said flanges and around said pipe whereby said insulation jacket is securely and tightly fastened around said valve casing and is tightly sealed about said horizontal section.

4. The thermal insulation jacket as defined by any one of claims 1, 2 or 3 wherein said central section comprises at least one weep hole adapted to permit fluid to drain out of said insulation jacket.

5. The insulation jacket combination as defined by claim 1 wherein said cap comprises a belt, said belt being adapted to extend below and around said valve casing whereby said cap may be securely fastened around said valve casing.

6. The insulation jacket combination as defined by claim 5 wherein said cap comprises a slit therein whereby said cap may be fitted over a control wheel attached to said valve casing.

7. The insulation jacket as defined by claim 1 wherein one set of said flaps comprises insulation padding while the other set of said flaps comprises no insulation padding.

8. The insulation jacket as defined by claim 7 wherein each of said flaps comprising insulation padding further comprises a grommet at its end adapted to receive a wire for purposes of facilitating the assembly of said jacket.

9. The thermal insulation jacket as defined by claim 3 wherein each of said lateral sections ends in a flap and wherein each of the flaps on each end of said jacket is separated from one another by a "U"-shaped cutout adapted to surround the base of said valve casing.

10. The thermal insulation jacket as defined by either of claims 9 or 2 in combination with a skirt section, said skirt section comprising two parabolic sections adapted to cooperate with each of said "U"-shaped cutouts to effectively encase and insulate said valve casing.

11. The insulation jacket combination as defined by claim 10 further comprising an insulation cap, said cap being adapted to cover the top of said skirt.

* * * * *

UNITED STATES PATENT AND TRADEMARK OFFICE
CERTIFICATE OF CORRECTION

PATENT NO. : 4,207,918

DATED : June 17, 1980

INVENTOR(S) : David Burns; James R. Spicer

It is certified that error appears in the above—identified patent and that said Letters Patent is hereby corrected as shown below:

Abstract, line 8: "casting" should read ---casing---;

Column 1, line 22: "WITHEIM" should read ---WITHEM---;

Column 2, line 3: "partialy" should read ---partially---;

line 49: "longitudnal" should read ---longitudinal---;

Column 3, line 42: "velcro" should read ---VELCRO---;

Claim 1, line 11: after "other" ---,--- should be inserted;

line 18: "section," should be deleted;

line 22: "a" should read ---an---; and

Claim 10, line 2: "9 or 2" should read -- 2 or 9 --.

Signed and Sealed this

Twenty-sixth Day of August 1980

[SEAL]

Attest:

SIDNEY A. DIAMOND

Attesting Officer     Commissioner of Patents and Trademarks